United States Patent [19]

Hong

[11] Patent Number: 5,414,473
[45] Date of Patent: May 9, 1995

[54] APPARATUS AND METHOD FOR ENHANCING TRANSIENT EDGE OF VIDEO SIGNAL

[75] Inventor: Sung H. Hong, Seoul, Rep. of Korea

[73] Assignee: Goldstar Co., Ltd., Seoul, Rep. of Korea

[21] Appl. No.: 101,892

[22] Filed: Aug. 2, 1993

[30] Foreign Application Priority Data

Aug. 3, 1992 [KR] Rep. of Korea .............. 13947/1992

[51] Int. Cl.[6] .......................................... H04N 5/208
[52] U.S. Cl. ...................................... 348/625; 348/627
[58] Field of Search .................. 358/166, 167, 37, 36, 358/38, 39, 140, 19, 188, 191.1, 148, 150, 153, 23, 154; H04N 5/14, 5/208; 348/625, 626, 627, 628, 629, 630, 631, 606

[56] References Cited

U.S. PATENT DOCUMENTS

| 4,159,481 | 6/1979 | Mikado .......................... | 358/153 |
| 4,962,427 | 10/1990 | Lunn et al. ....................... | 358/140 |
| 5,150,214 | 9/1992 | Shin et al. ....................... | 358/166 |

FOREIGN PATENT DOCUMENTS

| 0119470 | 5/1990 | Japan .......................... | H04N 5/208 |
| 0200066 | 8/1990 | Japan .......................... | H04N 5/208 |

Primary Examiner—James J. Groody
Assistant Examiner—Michael H. Lee
Attorney, Agent, or Firm—Fliesler, Dubb, Meyer & Lovejoy

[57] ABSTRACT

An apparatus and a method for enhancing a transient edge of a video signal. The enhancement apparatus comprises a synchronization region detection circuit for detecting a synchronization region from a composite video signal inputted therein and outputting the resultant synchronization region detection signal, a coring circuit for removing upper and lower level noise components of the synchronization region detection signal, a transient width detection circuit for detecting a transient width of a synchronization signal from the noise-removed synchronization region detection signal, an enhancement circuit for varying a frequency band of the video signal to be enhanced, according to, the detected transient width of the synchronization signal from the transient width detection circuit and enhancing the transient edge of the video signal of the varied frequency band, an attenuator for adjusting an enhancement level of the enhanced video signal from the enhancement circuit, a delay matching unit for delaying the inputted video signal by a predetermined time period to match it with an output signal from the attenuator, and an adder for adding an output signal from the delay matching unit to the output signal from the attenuator and outputting the resultant enhanced video signal.

4 Claims, 5 Drawing Sheets

APPARATUS AND METHOD FOR ENHANCING TRANSIENT EDGE OF VIDEO SIGNAL

BACKGROUND OF THE INVENTION

1. Field of the Invention

The present invention relates in general to video signal processing systems, and more particularly to an apparatus and a method for enhancing a transient edge of a video signal, in which a pass band of a filter for enhancement is varied according to a band width of the video signal so that the enhancement on the transient edge can be performed suitably to the type of the video signal, resulting in an increase in the definition of a picture.

2. Description of the Prior Art

Conventionally, to obtain a distinct picture, there has been proposed an apparatus for enhancing a transient edge of a luminance signal or a color signal separated from a video signal. More particularly, the conventional enhancement apparatus is adapted to allow the user to visually feel the distinct picture, by dropping an overshoot and an undershoot of the edge. One example of this form of apparatus is shown in a block form in FIG. 1, herein.

Figure 1:
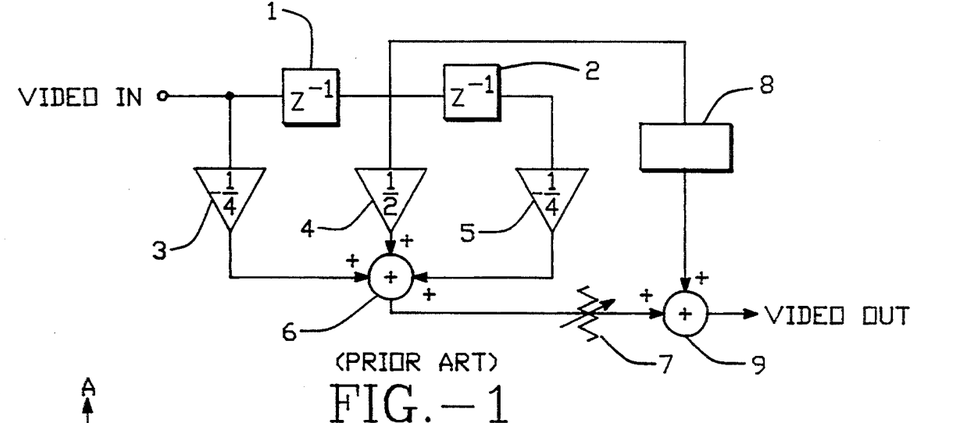
FIG. 1 is a block diagram of a conventional apparatus for enhancing a transient edge of a video signal.

As shown in FIG. 1, the conventional apparatus for enhancing the transient edge of the video signal comprises delays 1 and 2 for sequentially delaying the video signal inputted therein, amplifiers 3–5 for amplifying the original video signal and the video signals delayed by the delays 1 and 2, respectively, an adder 6 for adding output signals from the amplifiers 3–5, an attenuator 7 for adjusting an enhancement level of an output signal from the adder 6, a delay matching unit 8 for matching an output signal from the attenuator 7 with the output signal from the delay 1, and an adder 9 for adding an output signal from the delay matching unit 8 to the output signal from the attenuator 7 and outputting the resultant enhanced video signal.

The operation of the conventional enhancement apparatus with the above-mentioned constructing will hereinafter be described.

Upon inputting the video signal, the amplifier 3 amplifies the inputted video signal and then applies the amplified video signal to the adder . Also, the inputted video signal is sequentially delayed by a predetermined time period by the delays 1 and 2. The video signals sequentially delayed by the delays 1 and 2 are amplified by the amplifies 4 and 5, respectively, and then applied to the adder 6.

Noticeably, the inputted video signal is enhanced vertically if the delay time of the delays 1 and 2 is a period of one line, while horizontally if the delay time is a period of one sample. Namely, since the overshoot and undershoot occur at the transient edge of the video signal differentiated by the delays 1 and 2 and the amplifiers 3–5, the edge enhancement is performed.

The enhancement level of the enhanced signal is adjusted by the attenuator 7, which then applies the enhanced signal of the adjusted enhancement level to the adder 9.

On the other hand, the delay matching unit 8 matches the output signal from the attenuator 7 with the output signal from the delay 1 and then applies the matched signal to the adder 9. As a result, the adder 9 adds the output signal from the delay matching unit 8 to the output signal from the attenuator 7 and outputs the resultant enhanced video signal.

Figure 2:
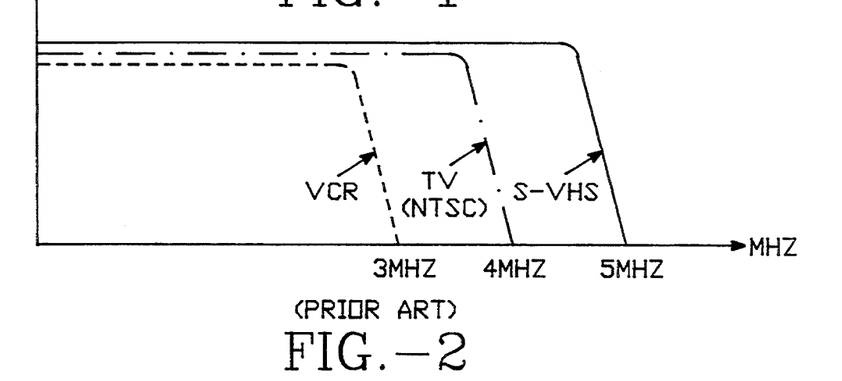
FIG. 2 is a graph illustrating natural frequency characteristics of video signals in a VCR, a NTSC broadcasting TV and a S-VHS.

For example, in a NTSC broadcasting system, the luminance signal has a band width of 4.2 MHz with its edge portion being 2 to 3.5 MHz. Therefore, the distinct picture is obtained by enhancing the frequency band component of the edge portion using the delays and amplifiers. By the way, various signal processing systems such as a VCR, a NTSC broadcasting television receiver, a S-VHS have different natural frequency characteristics of video signals, that is, band widths of 3 Mhz, 4 Mhz and 5 Mhz, respectively, as shown in FIG. 2.

Figure 3:
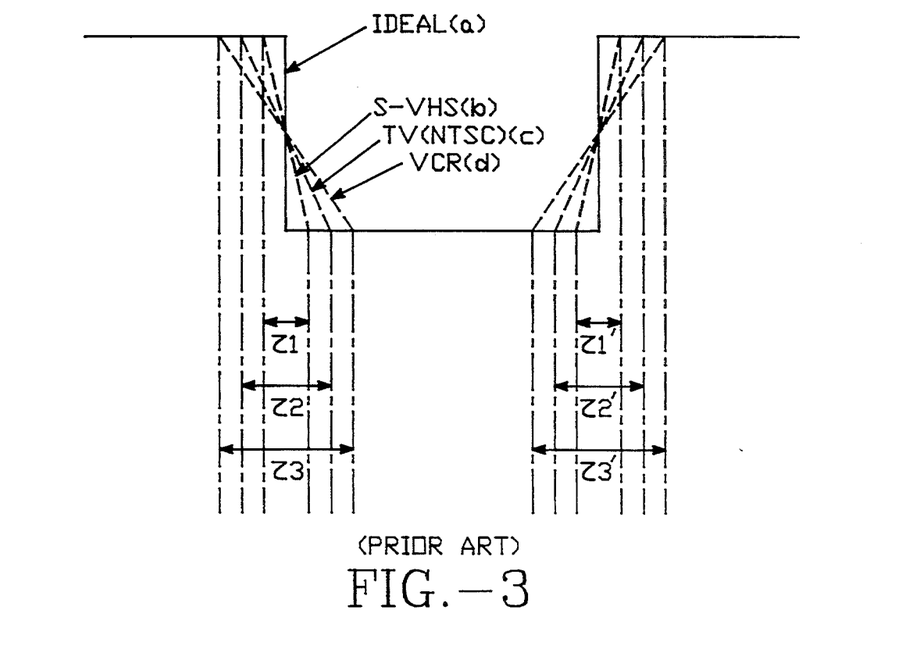
FIG. 3 is a graph illustrating transient widths of synchronization signals in the video signals in FIG. 2.

And, in FIG. 3, when the synchronization signals transient from high level to low level, the ideal synchronization signal has no transient width, while the synchronization signals corresponding to the S-VHS, the NTSC broadcasting television receiver and the VCR have the transient widths of 1, 2 and 3, respectively. When the synchronization signals transient from low level to high level, the ideal synchronization signal has no transient width, the synchronization signals corresponding to the S-VHS, the NTSC broadcasting television receiver and the VCR have the transient widths of 1, 2 and 3, respectively. As a result, the transient widths of the synchronization signals can be counted by a counter using clock signals. For this reason, the enhancement on the transient edge must accurately be performed according to the different natural frequency characteristics.

However, the conventional enhancement apparatus has a disadvantage in that the frequency region to be enhanced is fixed to 2 to 4MHz. Namely, in the conventional enhancement apparatus, the enhancement on the transient edge is performed on the basis of the NTSC broadcasting television receiver having the band width of 4MHz as shown in FIG. 2. For this reason, in the case where the conventional enhancement apparatus is applied to the VCR or S-VHS, a frequency band other than the edge portion is enhanced, resulting in an unnaturalness and a degradation in the picture quality.

In other words, when the enhancement apparatus for the NTSC broadcasting television receiver is applied to the VCR, a high frequency signal component is enhanced, thereby causing the output video signal to have a considerable amount of noise. Also, in the case where the enhancement apparatus for the NTSC broadcasting television receiver is applied to the S-VHS, the edge portion is enhanced together with a frequency component lower than that, resulting in the unnaturalness in the output video signal.

SUMMARY OF THE INVENTION

Therefore, the present invention has been made in view of the above problems, and it is an object of the present invention to provide an apparatus and a method for enhancing a transient edge of a video signal, in which a natural and distinct picture is obtained by detecting a transient width of a synchronization signal from a composite video signal and varying a frequency region to be enhanced, according to the detected transient width, to enhance the frequency region corresponding to the type of the video signal.

In accordance with one aspect of the present intention, there is provided an apparatus for enhancing a transient edge of a video signal, comprising: synchronization region detection means for detecting a synchronization region from a composite video signal inputted therein and outputting the resultant synchronization region detection signal; coring means for removing upper and lower level noise components of the synchronization region detection signal from said synchronization region detection means; transient width detection means for detecting a transient width of a synchronization signal from the noise-removed synchronization region detection signal from said coring means; enhancement means for varying a frequency band of the video signal to be enhanced, according to the detected transient width of the synchronization signal from said transient width detection means and enhancing the transient edge of the video signal of the varied frequency band; attenuation means for adjusting an enhancement level of the enhanced video signal from said enhancement means; delay matching means for delaying the inputted video signal by a predetermined time period to match it with an output signal from said attenuation means; and adding means for adding an output signal from said delay matching means to the output signal from said attenuation means and outputting the resultant enhanced video signal.

In accordance with another aspect of the present invention, there is provided a method of enhancing a transient edge of a video signal, comprising the steps of: obtaining a difference between adjacent ones of pixels of the inputted video signal, detecting an absolute value of the obtained difference and detecting a transient width of a synchronization signal by counting a transient component of a synchronization region in response to the detected absolute value; and varying a frequency band of a filter for enhancement according to the detected transient width of the synchronization signal so that the enhancement on the transient edge can be performed at a frequency region corresponding to the type of the inputted video signal.

BRIEF DESCRIPTION OF THE DRAWINGS

The above and other objects, features and advantages of the present invention will be more clearly understood from the following detailed description taken in conjunction with the accompanying drawings, in which:

FIG. 8B is a waveform diagram of a synchronization region which is detected from the composite video signal in FIG. 6A in accordance with the present invention;

DETAILED DESCRIPTION OF THE PREFERRED EMBODIMENTS

Figure 4:
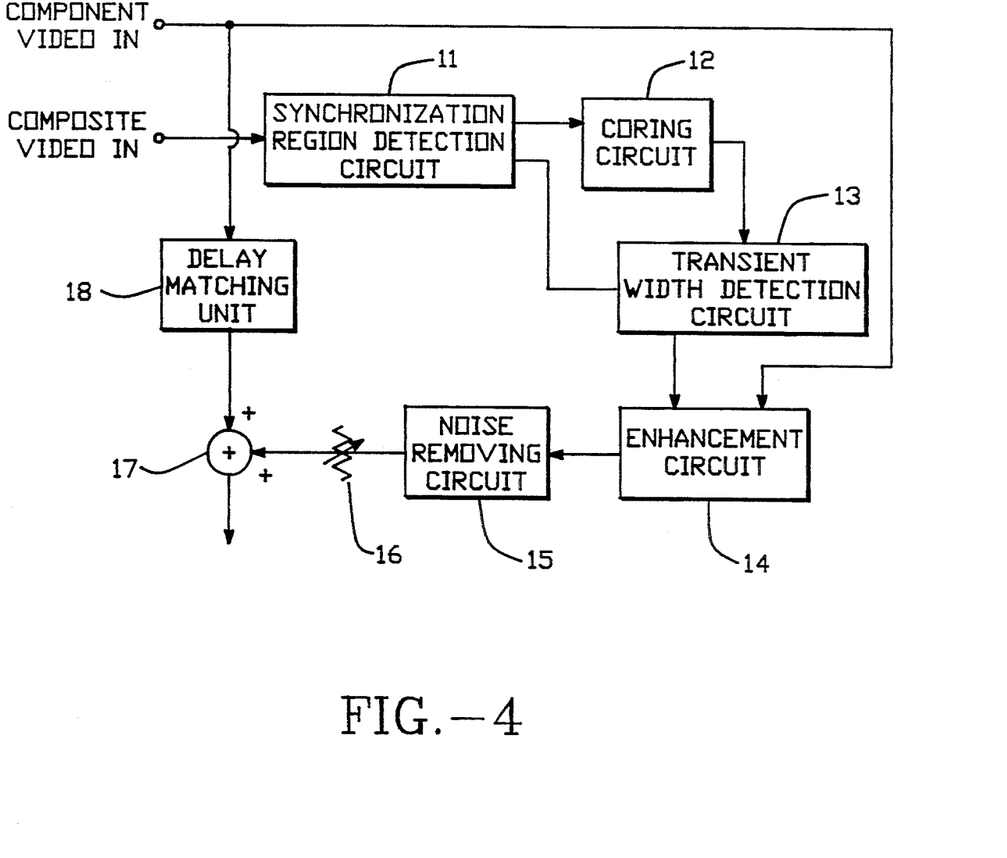
FIG. 4 is a block diagram of an apparatus for enhancing a transient edge of a video signal in accordance with the present invention.

Referring to FIG. 4, there is shown a block diagram of an apparatus for enhancing a transient edge of a video signal in accordance with the present invention. As shown in this drawing, the enhancement apparatus of the present invention comprises a synchronization region detection circuit 11 for detecting a synchronization region and a synchronization signal from a composite video signal inputted therein and outputting the resultant synchronization region detection signal and a synchronization signal, a coring circuit 12 for removing upper and lower level noise components of the synchronization signal from the synchronization region detection circuit 11, a transient width detection circuit 13 for detecting a transient width of a synchronization signal from the noise-removed synchronization signal from the coring circuit 12, and an enhancement circuit 14 for varying a frequency band of the component video signal to be enhanced, according to the detected transient width of the synchronization signal from the transient width detection circuit 13 and enhancing the transient edge of the component video signal of the varied frequency band.

A noise removing circuit 15 is also provided in the enhancement apparatus to remove a noise component of the enhanced video signal from the enhancement circuit 14.

An attenuator 16 is also provided in the enhancement apparatus to adjust an enhancement level of the noise-removed video signal from the noise removing circuit 15.

The enhancement apparatus also comprises a delay matching unit 18 for delaying the inputted component video signal by a predetermined time period to match it with an output signal from the attenuator 16 and an adder 17 for adding an output signal from the delay matching unit 18 to the output signal from the attenuator 16 and outputting the resultant enhanced video signal.

Figure 5:
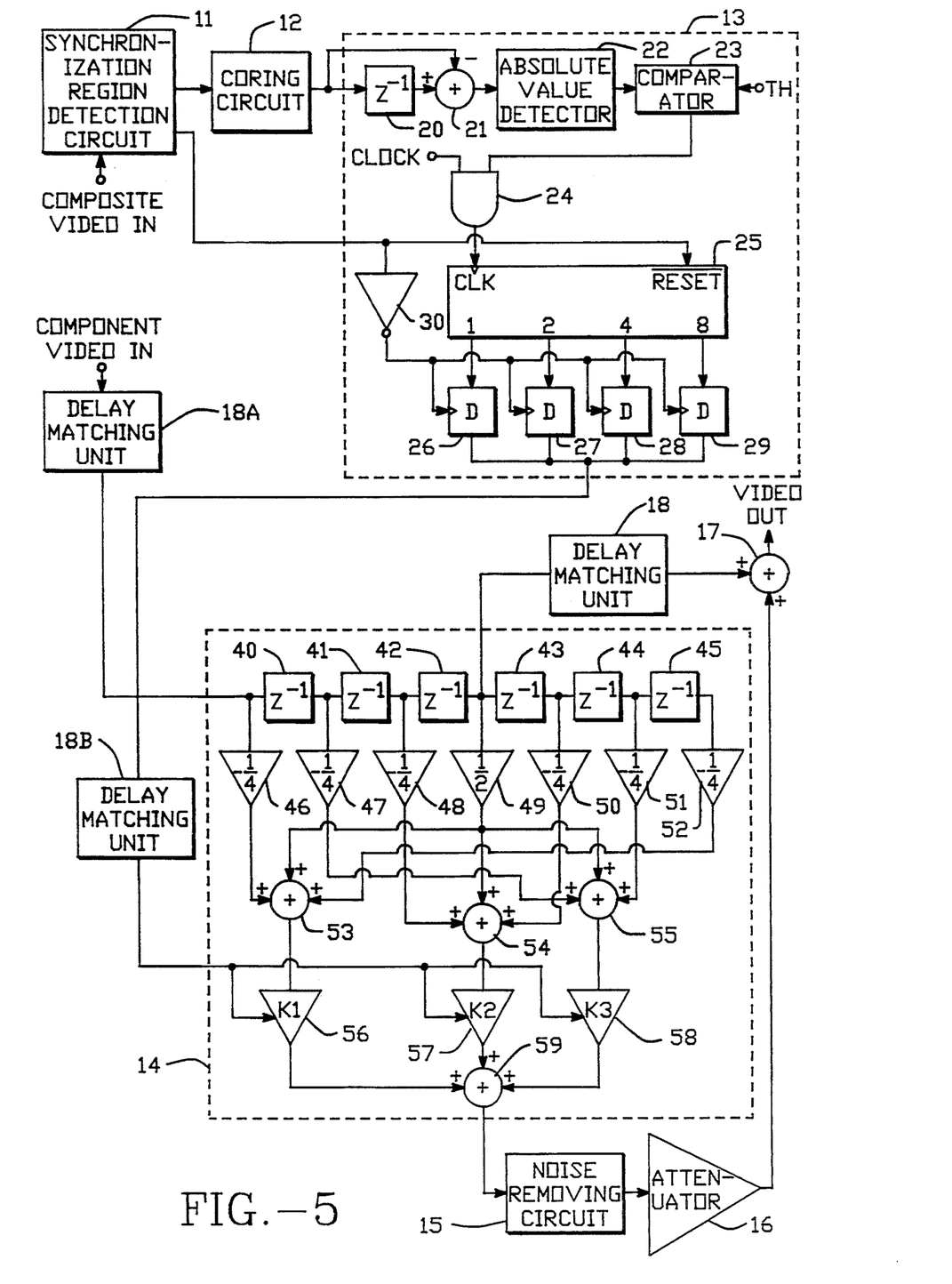
FIG. 5 is a detailed block diagram of the apparatus in FIG. 4.

Referring to FIG. 5, there is shown a detailed block diagram of the enhancement apparatus in FIG. 4. As shown in this drawing, the transient width detection circuit 13 includes a sample memory 20 for delaying the noise-removed synchronization signal from the coring circuit 12, a subtracter 21 for subtracting the synchronization signal from the coring circuit 12 from the delayed synchronization signal from the sample memory 20, an absolute value detector 22 for detecting an absolute value of an output signal from the subtracter 21, a comparator 23 for comparing an output signal from the absolute value detector 22 with a reference value TH and detecting a transient component in accordance with the compared result, and an AND gate 24 for ANDing an output signal from the comparator 23 and a system clock signal CLOCK.

The transient width detection circuit 13 also includes a counter 25 for counting the transient component of the synchronization signal from the synchronization region detection circuit 11 in response to an output signal from the AND gate 24, one bit memories 26–29, each for storing an output signal from the counter 25 and outputting the stored signal as the transient width of the synchronization signal to the enhancement circuit 14, and an inverter 30 for inverting the synchronization region detection signal from the synchronization region detection circuit 11 and outputting the inverted signal as a clock signal to the one bit memories 26–29.

Also, the enhancement circuit 14 includes a plurality of sample memories 40–45, a plurality of amplifiers 46–52 and a plurality of adders 53–55 having a transfer function of $H(z) = \frac{1}{2} - \frac{1}{4}(z^{-n} + z^{+n})$ with respect to the inputted video signal, a plurality of variable amplifiers 56–58, each for amplifying a corresponding one of output signals from the adders 53–55 according to the detected transient width of the synchronization signal from the transient width detection circuit 13, and an adder 59 for adding output signals from the variable amplifiers 56-58 and outputting the resultant video signal to the noise removing circuit 15.

Here, the reference numerals 18A and 18B, not described, designate delay matching units, respectively.

A method of enhancing a transient edge of a video signal in accordance with the present invention comprises the step of obtaining a difference between adjacent ones of pixels of the inputted synchronization signal, detecting an absolute value of the obtained difference and detecting transient width of a synchronization signal by counting a transient component of a synchronization region in response to the detected absolute value and the step of varying a frequency band of a filter for enhancement according to the detected transient width of the synchronization signal so that the enhancement on the transient edge can be performed at a frequency region corresponding to the type of the inputted video signal.

The operation of the enhancement apparatus with the above-mentioned construction in accordance with the present invention will hereinafter be described in detail with reference of FIGS. 4 to 9.

Figure 6A:
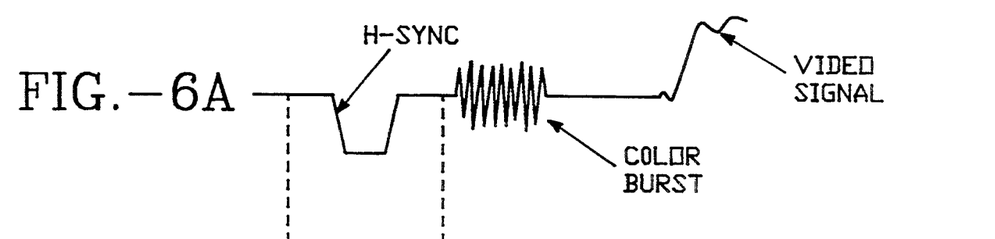
FIG. 6A is a waveform diagram of a general composite video signal.
Figure 6B:
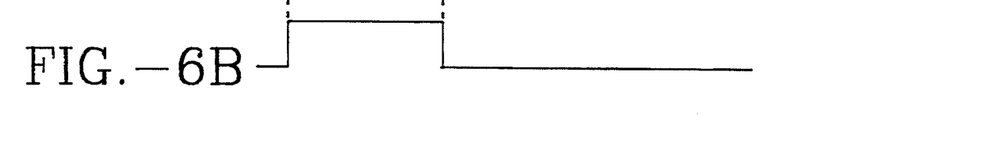

Upon inputting the composite video signal as shown in FIG. 6A, the synchronization region detection circuit 11 detects the synchronization region from the composite video signal and outputs the resultant synchronization region detection signal and horizontal synchronization, the synchronization region containing a horizontal synchronization signal H-Sync as shown in FIG. 6B.

The synchronization region detection signal is of a width greater than that of the horizontal synchronization signal H-Sync. Also, the synchronization region detection signal is high in the region containing the synchronization signal, while low in the remaining region.

Figure 7A:
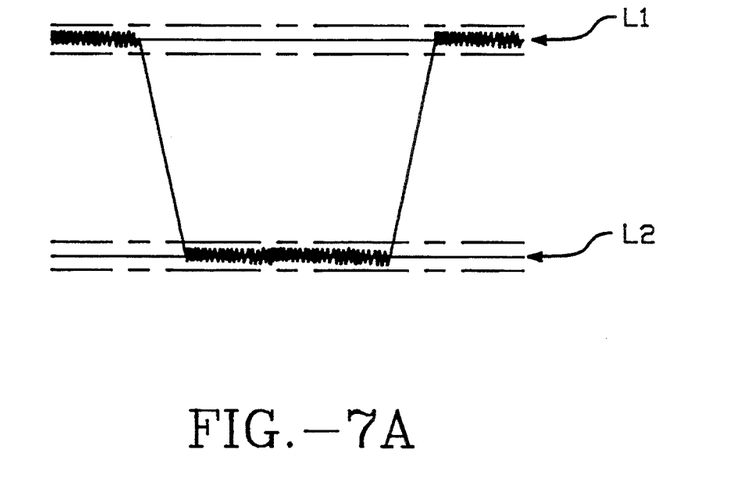
FIG. 7A is a waveform diagram of a synchronization region detection signal from a synchronization region detection circuit in the apparatus in FIG. 4.
Figure 7B:
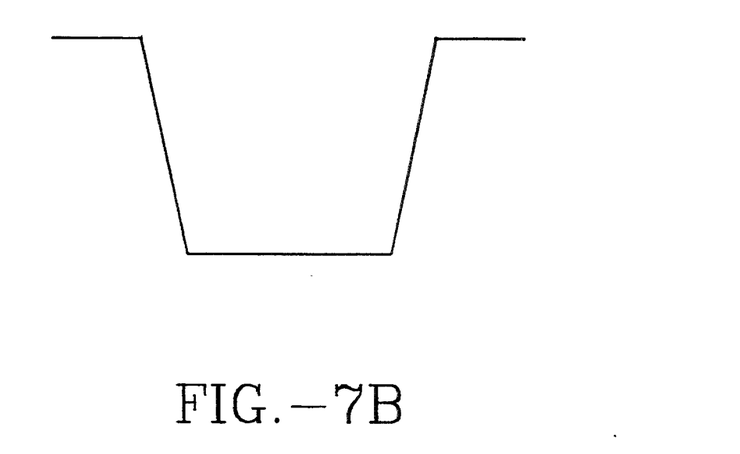
FIG. 7B is a waveform diagram of the synchronization region detection signal in FIG. 7A in which a noise component is removed in accordance with the present invention.

The synchronization signal from the synchronization region detection circuit 11 is applied to the coring circuit 12. In the coring circuit 12, the upper and lower level (pedestal level) noise components of the synchronization signal from the synchronization region detection circuit 11 as shown in FIG. 7A is removed as shown in FIG. 7B, resulting in prevention of an error from being generated due to the noise components in detecting the transient width of the synchronization signal.

Then, the transient width detection circuit 13 detects the transient width of the synchronization signal from the noise-removed synchronization signal from the coring circuit 12. In the transient width detection circuit 13, the sample memory 20 delays the noise-removed synchronization signal from the coring circuit 12 by one clock and then applies the delayed synchronization signal to the subtracter 21 which is also applied with the noise-removed synchronization signal from the coring circuit 12. The subtracter 21 subtracts the synchronization signal from the one clock-delayed synchronization signal and outputs the resultant signal to the absolute value detector 22. The absolute value detector 22 detects the absolute value of the output signal from the subtracter 21.

The detected absolute value from the absolute value detector 22 is compared with the reference value TH by the comparator 23 for determination of the transient edge. If the detected absolute value is higher than the reference value TH the comparator 23 outputs a high signal since the transient edge is present in the detected synchronization region. On the contrary, if the detected absolute value is not higher than the reference value TH, the comparator 23 outputs a low signal since the transient edge is not present in the detected synchronization region.

When the high signal is outputted from the comparator 23, the AND gate 24 applies the clock signal CLOCK to a clock terminal of the counter 25. As a result, the counter 25 is driven to count the transient component of the synchronization signal from the synchronization region detection circuit 11. Namely, because the synchronization region detection signal from the synchronization region detection circuit 11 is applied to a reset terminal RESET of the counter 25, the counter 25 is not driven in the remaining region other than the synchronization region. This makes possible to count the transient width of the synchronization signal.

The counted value from the counter 25 is applied to the one bit memories 26–29, each of which stores the counted value from the counter 25 as the transient width of the synchronization signal at a falling edge of the synchronization region detection signal inverted by the inverter 30.

Then, the detected transient width of the synchronization signal from the memories 26–29 in the transient width detection circuit 13 is applied to the enhancement circuit 14. The enhancement circuit 14 is adapted to filter the inputted video signal at different frequency bands according to the detected transient width of the synchronization signal from the transient width detection circuit 13 so that the enhancement on the transient edge can be performed at a frequency region corresponding to the type of the inputted video signal.

In the enhancement circuit 14, the inputted video signal is passed through the sample memories 40–45, the amplifiers 46–52 and the adders 53–55 having the transfer function of $H(z) = \frac{1}{2} - \frac{1}{4}(z^{-n} + z^{+n})$ so that a specified frequency band can be enhanced according to the type of the video signal. Levels of signals filtered by the sample memories 40–45, the amplifiers 46–52 and the adders 53–55 are varied by the variable amplifiers 56–58, amplification degrees K1–K3 (where, K1+K2+K3=1) of which are adjusted according to the detected transient width of the synchronization signal from the transient width detection circuit 13. Then, the adder 59 adds the output signals from the amplifiers 56–58 and outputs the resultant video signal enhanced based on the transient width of the synchronization signal.

It should be noted that the sample memories 40-45, the amplifiers 46-52 and the adders 53-55 constitute band pass filters of different frequency characteristics, respectively.

In other words, the inputted video signal is sequentially stored in the sample memories 40-45, being shifted to the next sample memory. The adder 53 adds output signals from the $-\frac{1}{4}$ amplifiers 46 and 52 and the $\frac{1}{2}$ amplifier 49. As a result, a frequency band of fs/6 (fs is a sampling frequency and 4.3 MHz) is enhanced. This frequency band is applied to a video signal in a VCR, and is filtered with a response characteristic as shown by (b) in FIG. 8.

Also, the adder 54 adds output signals from the $-\frac{1}{4}$ amplifiers 48 and 50 and the $\frac{1}{2}$ amplifier 49. As a result a frequency band of fs/4 is enhanced. This frequency band is applied to a video signal in a NTSC broadcasting TV, and is filtered with a response characteristic as shown by (c) in FIG. 8.

On the other hand, the adder 55 adds output signals from the $-\frac{1}{4}$ amplifiers 47 and 51 and the $\frac{1}{2}$ amplifier 49. As a result, a frequency band of fs/2 is enhanced. This frequency band is applied to a video signal in a S-VHS, and is filtered with a response characteristic as shown by (d) in FIG. 8.

Figure 8:
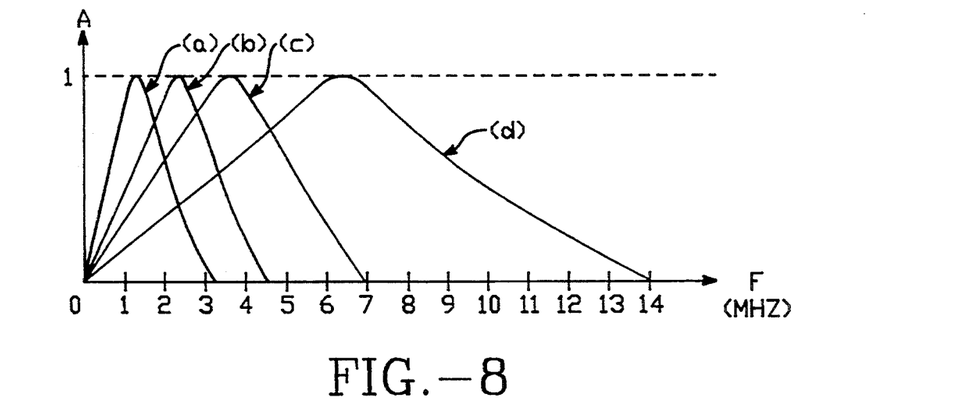
FIG. 8 is a graph illustrating frequency response characteristics of filters in accordance with the present invention.

The reference numeral (a) in FIG. 8 designates a frequency response characteristic of a filter corresponding to $\frac{1}{2} - \frac{1}{4}(z^{-4} + z^{+4})$.

Then, the output signals from the adders 53-55 are amplified by the variable amplifiers 56-58 by the different amplification degrees based the detected transient width of the synchronization signal from the transient width detection circuit 13, respectively, and then added by the adder 59. As a result outputted from the adder 59 is the video signal enhanced suitably to its frequency band.

Figure 9:
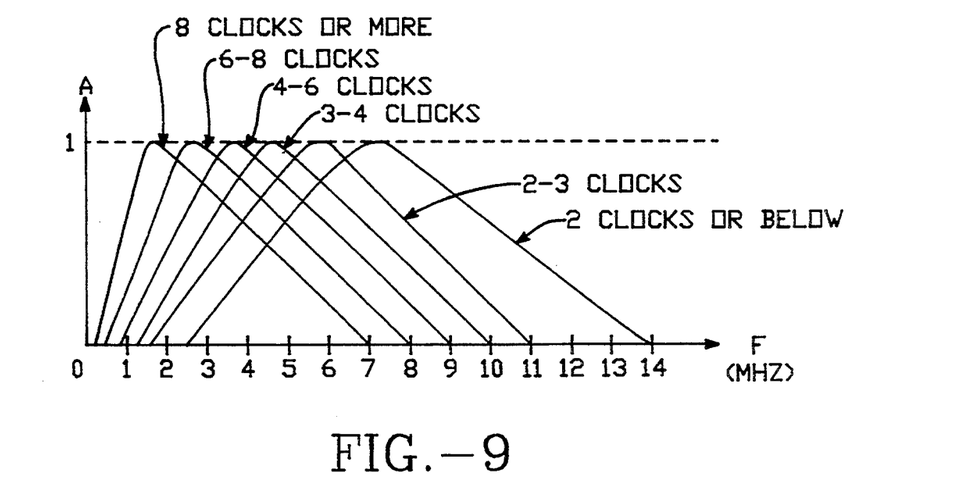
FIG. 9 is a graph illustrating frequency response characteristics depending on an transient edge of a synchronization signal in accordance with the present invention.

FIG. 9 is a graph illustrating frequency response characteristics of the output signal from the adder 59 depending on the transient edge of the synchronization signal. As shown in this drawing, the frequency band to be enhanced is maximized when the transient edge of the synchronization signal is smaller than or equal to 2 clocks and it is minimized when the transient edge of the synchronization signal is greater than or equal to 8 clocks. In result, the narrower transient edge detected, the more frequency band enhanced.

Therefore, since the enhancement frequency band on the transient edge of the video signal to be enhanced is varied according to the transient edge of the synchronization signal, the optimum filtering can be performed with respect to the inputted video signal.

Thereafter, the noise component of the video signal of the varied frequency band from the adder 59 in the enhancement circuit 14 is removed by the noise removing circuit 15 and the enhancement level thereof is hen adjusted by the attenuator 16. In result, the adder 17 adds the video signal delayed by the delay matching unit 18 to the output signal from the attenuator 16 and outputs the resultant enhanced video signal.

Figure 10:
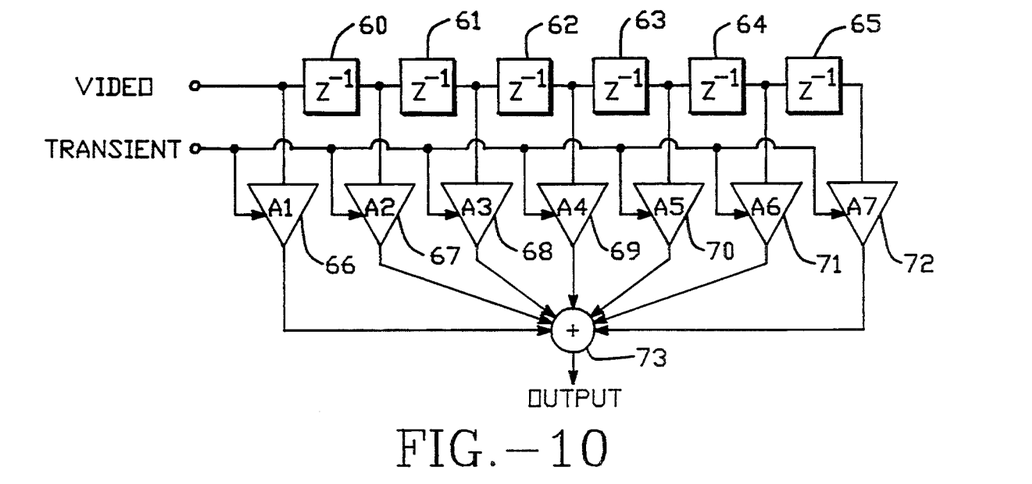
FIG. 10 is a detailed block diagram of an alternative embodiment of an enhancement circuit in the apparatus in FIG. 4 in accordance with the present invention.

Referring to FIG. 10, there is shown a detailed block diagram of an alternative embodiment of the enhancement circuit 14 in the apparatus in FIG. 4 in accordance with the present invention. As shown in this drawing, the enhancement circuit 14 includes a plurality of sample memories 60-65 for sequentially storing the inputted video signal and a plurality of variable filters 66-72 having coefficients A1-A7 varied according to the detected transient width of the synchronization signal from the transient width detection circuit 13. Each of the variable filters 66-72 is adapted to filter a corresponding one of the inputted video signal and output signals from the sample memories 60-65 according to the varied coefficient.

The enhancement circuit 14 also includes an adder 73 for adding output signals from the variable filters 66-72 and outputting the resultant video signal to the circuit 15.

In operation, the inputted video signal is sequentially stored in the sample memories 60-65 by one clock, being shifted to the next sample memory, and then applied to the corresponding variable filters 66-72. On the other hand, the coefficients A1-A7 of the variable filters 66-72 are varied according to the detected transient width of the synchronization signal from the transient width detection circuit 13. Then, the variable filters 66-72 filter the inputted video signal and the output signals from the sample memories 60-65 according to the varied coefficients, respectively. Therefore, the frequency band to be enhanced is varied suitably to the type of the inputted video signal.

On the other hand, to raise a reliability in the detection of the transient edge of the synchronization signal, in the step of detecting the transient width of the synchronization signal in the enhancement method, a plurality of transient widths of the synchronization signal may be detected, the average of the detected transient widths may be calculated and the calculated average may be determined as the transient width of the synchronization signal for the presently inputted video signal. Also, the coefficients of the filters in the enhancement circuit 14 can be increased according to the determined transient width of the synchronization signal, so as to filter the frequency band more accurately. Further, the type or the frequency band of the inputted video signal can be detected by analyzing a correlation between the inputted video signal and the transient width of the synchronization signal.

As hereinbefore described, according to the present invention, the type or the frequency band of the inputted video signal can be detected by detecting the transient width of the synchronization signal for the inputted video signal. Therefore, a natural and distinct picture is obtained by enhancing the frequency region corresponding to the type of the video signal through the filtering suitable to the inputted video signal.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for enhancing a transient edge of a video signal, comprising:
    synchronization region detection means for detecting a synchronization region from the video signal and extracting a synchronization signal therefrom and outputting a resultant synchronization region detection signal;
    coring means for removing upper and lower level noise components of the synchronization region detection signal to form a noise-removed synchronization signal;

transient width detection means for detecting a transient width of a transient edge of the noise-removed synchronization signal;

enhancement means for varying a frequency band of the video signal according to the transient width to enhance a transient edge of the video signal to form an enhanced video signal;

attenuation means for attenuating the enhanced video signal to form an attenuated video signal;

delay matching means for delaying the video signal by a predetermined time period to match the attenuated video signal and form a delayed video signal; and adding means for adding the delayed video signal and the attenuated video signal to provide a resultant video signal.

2. An apparatus for enhancing a transient edge of a video signal, as set forth in claim 1, wherein said transient width detection means includes:

a sample memory for delaying the noise-removed synchronization signal to form a sample signal;

a subtracter for subtracting the noise-removed synchronization from the sampled signal from said sample memory to form a difference signal;

an absolute value detector for detecting an absolute value of the difference signal from said subtracter to form an absolute-value signal;

a comparator for comparing the absolute value signal from said absolute value detector with a reference value to form a compared result;

an AND gate for ANDing the compared result from said comparator and a system clock signal;

a counter for counting the transient component of the synchronization region detection signal in response to an output signal from said AND gate;

a plurality of one bit memories for storing a counter output from said counter as the transient width of the synchronization signal; and an inverter for inverting the synchronization region detection signal from said synchronization region detection means to form an inverted signal connected as a clock signal to store the counter output in said one bit memories.

3. An apparatus for enhancing a transient edge of a video signal, as set forth in claim 1, wherein said enhancement means includes:

a plurality of sample memories, a plurality of amplifiers and a plurality of adders having a transfer function of $H(z) = \frac{1}{2} - \frac{1}{4}(z^{-n} + z^{+n})$ with respect to the video signal;

a plurality of variable amplifiers, each for amplifying a corresponding one of output signals from said adders according to the detected transient width of the synchronization signal from said transient width detection means; and an adder for adding output signals from said variable amplifiers and outputting the resultant video signal to said attenuation means.

4. An apparatus for enhancing a transient edge of a video signal, as set forth in claim 1, wherein said enhancement means includes:

a plurality of sample memories for sequentially storing the video signal;

a plurality of variable filters having coefficients varied according to the transient width of the synchronization signal from said transient width detection means, said variable filters each filtering the video signal and output signals from said sample memories according to a respective one of the coefficients; and an adder for adding output signals from said variable filters and outputting the resultant video signal to said attenuation means.

* * * * *